United States Patent [19]

Tomabechi

[11] 4,319,293
[45] Mar. 9, 1982

[54] HEAD ADJUSTING MECHANISM

[75] Inventor: Hideo Tomabechi, Hachioji, Japan

[73] Assignee: Olympus Optical Co., Ltd., Tokyo, Japan

[21] Appl. No.: 92,363

[22] Filed: Nov. 8, 1979

[30] Foreign Application Priority Data

Nov. 16, 1978 [JP] Japan .................. 53-157810[U]

[51] Int. Cl.³ ............... G11B 21/24; G11B 21/12; G11B 5/54
[52] U.S. Cl. .................................. 360/105; 360/109; 360/128
[58] Field of Search ............... 360/105, 104, 109, 62, 360/2, 103, 130.2–130.21, 130.3–130.31, 128, 75

[56] References Cited

U.S. PATENT DOCUMENTS 4,181,920  1/1980  Cerekas ..................... 360/105

FOREIGN PATENT DOCUMENTS 623231  9/1978  U.S.S.R. ................ 360/130.21

OTHER PUBLICATIONS

IBM Tech. Disc. Bull., J. R. Kirksey, Magnetic Head Advance and Retraction Mechanism, vol. 20, No. 2, Jul. 1977, pp. 706–707.

Primary Examiner—Alfred H. Eddleman

[57] ABSTRACT

A head adjusting mechanism is disclosed which comprises a single, head adjusting leaf spring on which forward and reverse heads are alternately projected.

1 Claim, 2 Drawing Figures

HEAD ADJUSTING MECHANISM

BACKGROUND OF THE INVENTION

This invention relates to a head for use in a tape recorder and in particular a head adjusting mechanism which can adjust the mounting position of a magnetic head for a record-only, a reproduce-only and a record-/reproduce use.

In a tape recorder it is required that a magnetic head be contacted with the face of a tape during the run of a tape without, for example, an occurrence of an off-track, an off-gap and an off-gap angle state and a front-back inclination. In a known head adjusting mechanism a mounting base of a head is attached to a fixed chassis by a plurality of screws (for example three screws) with a compression spring coiled around the screw. The height of the head, as well as the front/back and right-/left positions of the head, is adjusted by the threaded states of the screws. The known head adjusting mechanism requires a larger number of mounting members such as screws and coil springs. In order to accurately adjust the front/back and right/left positions of the head a wider space is disadvantageously required, since the screws are located one at each vertex of a marginal triangle.

SUMMARY OF THE INVENTION

It is accordingly the object of this invention to provide a head adjusting mechanism which can accurately adjust the height of a magnetic head, as well as the front/back and right/left positions of the head, and requires no wider mounting space.

In order to attain this object, forward and reverse heads are mounted on a single leaf spring such that the forward had can be projected during the forward run of the tape and the reverse head during the reverse run of the tape. In this case, the heads are upwardly biased by the leaf spring.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENT

One preferred embodiment of this invention will be explained below by referring to the accompanying drawing.

Figure 1:
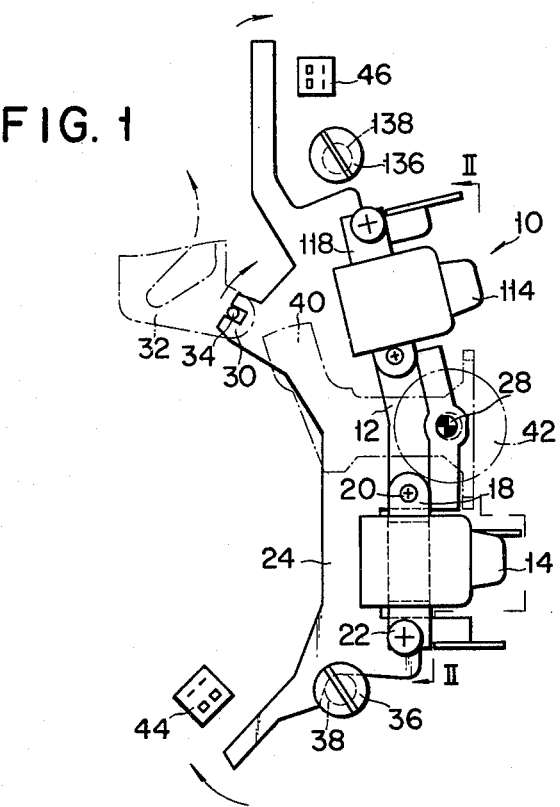
FIG. 1 is a plan view showing the state in which a head is mounted on a head support plate utilizing a head adjusting mechanism of this invention.
Figure 2:
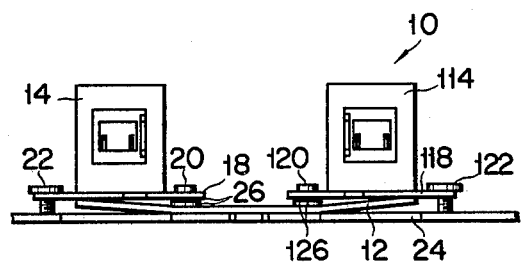
FIG. 2 is a right side view as viewed along line II—II in FIG. 1.

Referring to FIGS. 1 and 2 conjointly, a head adjusting mechanism 10 of this invention comprises a leaf spring 12 whose ends are upturned. Recording-production heads 14, 114 are mounted one on each upturned section of the leaf spring 12 such that they are upwardly biased by the leaf spring 12. Since the heads 14, 114 have the same construction, only the head 14 acting, for example, as a forward run member will be explained below for brevity. The head 14 is secured to a head mounting plate 18 which in turn is attached by screws 20, 22 to a head supporting plate 24 with the head mounting plate 18 located on the upturned section of the leaf spring 12. One (for example, 20) of the screws 20, 22 is attached with two washers 26, 26 fitted thereover, such that the mounting height of the head is set thereby. In this case, the mounting height of the head, as well as the left/right inclination of the head, can be accurately adjusted by adjusting the threaded state of the other screw 22. Since the leaf spring 12 has a considerable width 12 the head 14 rides on the leaf spring to prevent the front/back inclination of the head 14. The head supporting plate 24 is rotatably mounted by a rotation pin 28 on a fixed chassis and a two-tined projection 30 of the head supporting plate 24 is engaged with a pin 34 of a cam plate 32 which is rotated according to a reciprocatory movement of a plunger (not shown). In interlock with the rotation of the cam plate 32 the head supporting plate 24 is rotated around a rotation center 28 to permit the head to act as a forward head or a reverse head.

The recording-reproduction heads 14, 114 are alternately projected and retracted to permit reproduction in the forward and reverse modes. The head 14 is symmetrically equidistantly located with respect to the head 114 with the rotation center 28 as a reference point. That is, the screw 120 of the head 114 is located in an opposing relation to the screw 20 of the head 14 and the rotation position of the head supporting plate 24 is regulated by the abutment of the head supporting plate 24 against positioning pins 36 and 136 which are equidistantly located with the rotation center 28 as a reference point. The positioning pins 36 and 136 may be of such a type that they have annular grooves 38 and 138, respectively, each deviated from, for example, a center axis. By using such eccentric pins the rotation position of the head supporting plate 24 can be accurately adjusted over a wider range without requiring any extra mounting space. Reference numeral 40 shows a pinch roller supporting plate on which a pinch roller 42 is mounted. The pinch roller supporting plate is disposed above the head supporting plate 18. Reference numerals 44 and 46 show a head circuit changeover switch and motor polarity changeover switch, respectively.

According to the head adjusting mechanism of this invention the forward/reverse heads which can be alternately projected are attached to the single leaf spring such that they are upwardly biased by the leaf spring. The arrangement of this invention permits reduction of component parts required and a lowering of a manufacturing cost as compared with the known head adjusting mechanism having a compression spring coiled around each screw. Furthermore, a mounting space can be reduced as compared with the known head adjusting mechanism in which coil springs are arranged one at each vertex of a marginal triangle. Since a single leaf spring is used according to this invention, not only component parts can be reduced, but also an assembling cost can be reduced as compared with the head adjusting mechanism using two leaf springs to which the corresponding heads are attached. As the leaf spring has a considerable width, the head may ride on the leaf spring to automatically prevent the front/back inclination of the head. Furthermore, the mounting height of the head, as well as the right/left inclination, can be accurately adjusted by the threaded state of the screw, because the head mounting plate supporting the head is placed on the corresponding upturned section of the leaf spring.

What is claimed is:

1. A head adjusting mechanism comprising a single leaf spring on which forward and reverse heads ride and by which the heads are upwardly biased, said leaf spring having upturned end portions on which head mounting plates each supporting the corresponding head thereon are placed, respectively, the head mounting plate having its end portions attached by screws to a head supporting plate, and the forward and reverse heads being alternately projected such that one of them is contacted with the face of a tape.

* * * * *